United States Patent [19]

Torres

[11] Patent Number: 5,082,213
[45] Date of Patent: Jan. 21, 1992

[54] AIRCRAFT LOCK FOR RADIOS, POWER CONTROLS, AND FLIGHT CONTROLS AND METHOD

[76] Inventor: Ramon L. Torres, 4633 SW. 13th Ter., Miami, Fla. 33134

[21] Appl. No.: 551,626

[22] Filed: Jul. 10, 1990

[51] Int. Cl.$^5$ .............................................. B64C 13/14
[52] U.S. Cl. ...................................... 244/224; 70/200
[58] Field of Search ................. 180/90; 355/1 R, 224; 70/57, 182, 183, 187, 167, 200, 203, 212, 238, 247, 258

[56] References Cited

U.S. PATENT DOCUMENTS

| | | | |
|---|---|---|---|
| 3,833,190 | 9/1974 | Gaio | 244/224 |
| 3,898,823 | 8/1975 | Ludeman | 244/224 |
| 4,208,026 | 6/1980 | Reynolds | 244/224 |
| 4,228,974 | 10/1980 | Yates | 244/224 |
| 4,299,361 | 11/1981 | Webb | 244/224 |
| 4,473,203 | 9/1984 | Barnoin | 244/224 |
| 4,475,366 | 11/1984 | Marneris | 244/224 |
| 4,888,968 | 12/1989 | Asvedo | 244/224 |

Primary Examiner—Joseph F. Peters, Jr.
Assistant Examiner—Virna Lissi Mojica
Attorney, Agent, or Firm—Jack E. Dominik

[57] ABSTRACT

The use of a center lock bar which telescopingly receives two telescoping arms, each of which has a control column or shaft grip on its remote end is disclosed. The arms are secured to the parallel control columns by at least one gust lock pin. Provision is made for a throttle mixture lock plate to be secured to the lower portion of the radio lock pan which, in turn, has essentially parallel sidewalls with opposed openings through which the center lock bar passes. Optionally folding extension radio lock pans may be employed for a double stack installation. Finally, means are provided in the form of a lock, whether padlock or internally mounted, to lockingly secure the center lock bar to the two telescoping arms. The method of the invention looks to providing a lock for radios, throttles, and gust locks in a dual control aircraft by stabilizing the two control columns by means of a telescoping member which can accommodate differences in the distance between the parallel control columns of the aircraft. The step in addition to the foregoing of locking is done by securing at least one pin to one of the parallel control columns, and thereafter mounting a central radio stack and throttle control centrally of the central portion of the lock. Once these steps have been followed, a lock removably secures the center lock bar against movement relative to the radio lock pan and the flight controls as well as engine controls.

7 Claims, 4 Drawing Sheets

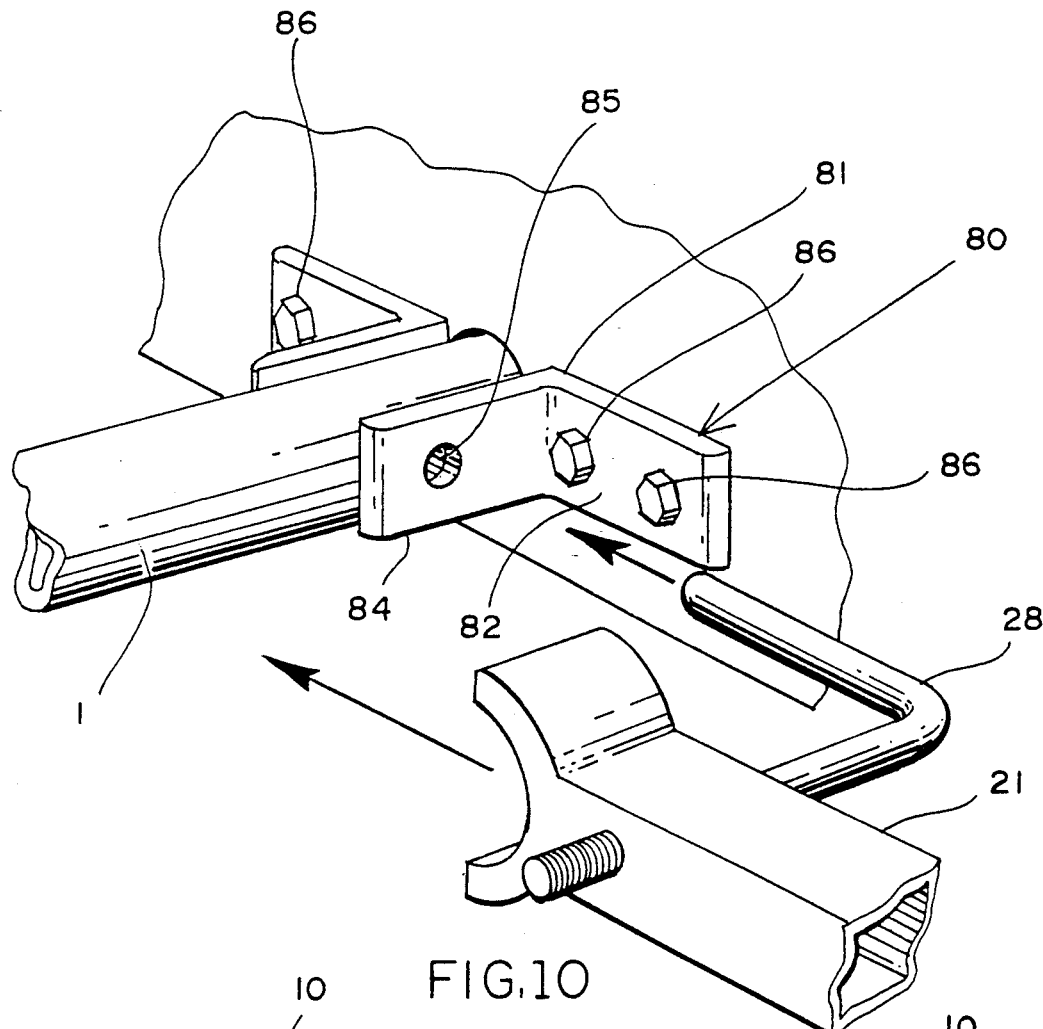
FIG.10
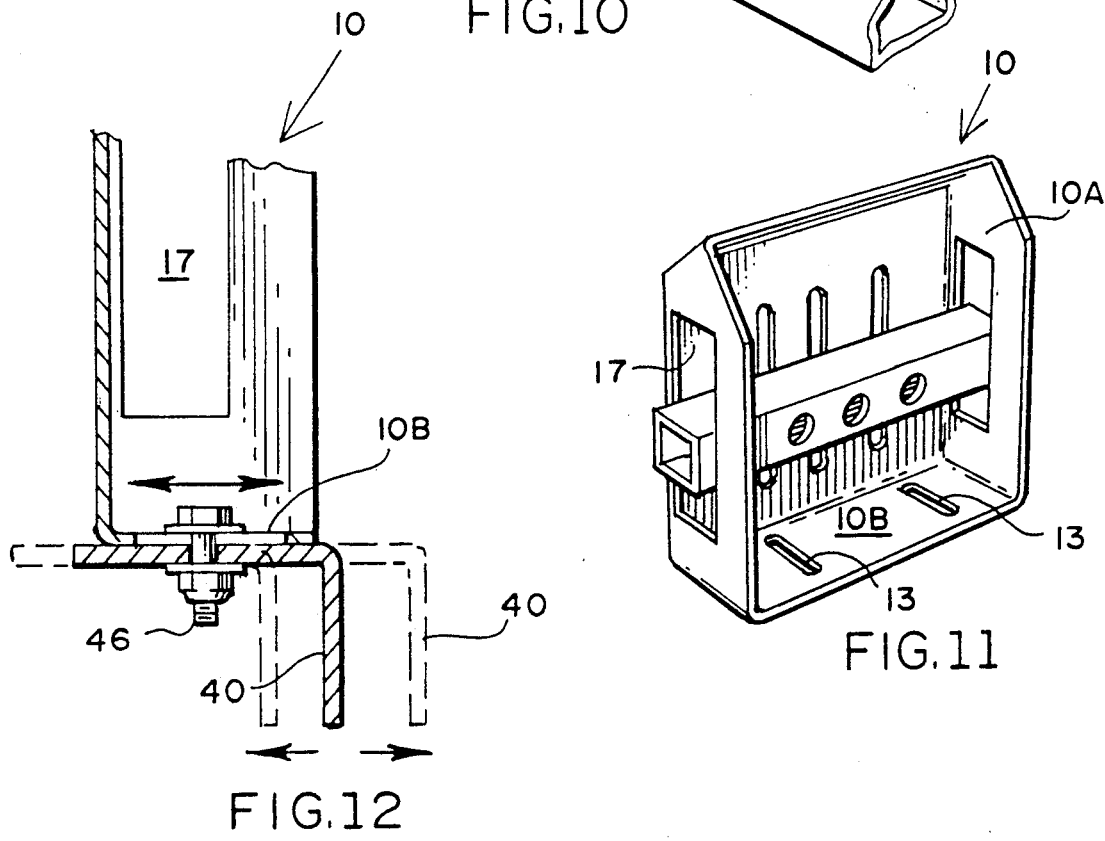
FIG.12
FIG.11

AIRCRAFT LOCK FOR RADIOS, POWER CONTROLS, AND FLIGHT CONTROLS AND METHOD

FIELD OF THE INVENTION

The present invention relates to locks for use on aircraft, which aircraft primarily have dual controls, comprising a control column or shaft and a wheel for each, power controls therebeneath, and an essentially mid-positioned radio stack. The same is primarily classified in Class 244, subclass 224 relating to aircraft controls, and gust locks.

SUMMARY OF THE PRIOR ART

Attempts have been made with various devices for securing aircraft, both single engine and multi-engine, which attempt to control the control wheels and lock the same while also shielding the radio stack. Exemplary of such patents are U.S. Pat. Nos. 4,299,361 and 4,888,968. In both of those devices an attempt was made to cover a portion of the instrument panel. Related U.S. Pat. No. 3,898,823 is directed to securing the controls of the aircraft, but does not address the power controls or securing the radio stack. Another example is U.S. Pat. No. 4,228,974 which does address the entire instrument panel and controls, but not the power controls. Finally, a resilient-type securement of the controls in the form of a gust lock is shown in U.S. Pat. No. 4,208,026.

What is needed, is a combination radio, power control, and flight control lock which is integrated to provide security to all three. Such a product needs to be compacted upon take down, light weight for purposes of carrying while airborne without overloading the aircraft, and readily adaptable with minor variations to a wide variety of single engine dual controlled aircraft.

SUMMARY OF THE INVENTION

The present invention derives from the use of a center lock bar which telescopingly receives two telescoping arms, each of which has a control column or shaft grip on its remote end. The arms are secured to the parallel control columns by at least one locking member. Provision is made for a power control lock plate to be secured to the lower portion of a radio lock pan which, in turn, has essentially parallel sidewalls with opposed openings through which the center lock bar passes. Optionally folding extension radio lock pans may be employed for a double stack installation. Finally, means are provided in the form of a lock, whether padlock or internally mounted, to lockingly secure the center lock bar to the two telescoping arms. The method of the invention looks to providing a lock for radios, power controls, and gust locks in a dual control aircraft by stabilizing the two control columns by means of a telescoping member which can accommodate differences in the distance between the parallel control columns of the aircraft. The step in addition to the foregoing of locking is done by securing at least one pin to one of the parallel control columns, and thereafter mounting a central radio stack and throttle control centrally of the central portion of the lock. Once these steps have been followed, a lock is removably secured to the center lock bar to preclude movement relative to the radio lock pan and the flight controls as well as power controls.

In view of the foregoing it will be seen that a principle object of the present invention is to provide a combination radio lock, power control lock, and flight control lock as well as method of their usage which secures the interior of the typical single engine dual control aircraft against theft as well as wind gusts.

A related object of the present invention is to provide security for the dual controlled aircraft which is widely adjustable and readily adaptable to different aircraft, whether single engine and multi-engine, just so long as they have dual controls of the wheel and column variety.

Still another object of the invention looks to the security of the aircraft as to radio, power controls, and gust locking which is theft resistant, light in weight, demountable for storage in flight, and inherently economical to construct.

BRIEF DESCRIPTION OF THE ILLUSTRATIVE DRAWINGS

Further objects and advantages of the present invention will become apparent as the following description of an illustrative and alternative embodiments take place, taken in conjunction with the accompanying drawings, in which:

FIG. 10 is a broken perspective view of a gust lock retrofit assembly for use in aircraft which do not have through holes in the control column for gust locks;

FIG. 11 is a view of the radio pan showing the forward/aft adjustment slots for the power control plate assembly;

FIG. 12 is an end view of the radio pan shown in FIG. 11 illustrating in phantom lines how the power control lock plate assembly can be adjusted with the means shown in FIG. 11.

DESCRIPTION OF A PREFERRED EMBODIMENT AND OPTIONS

Figure 1:
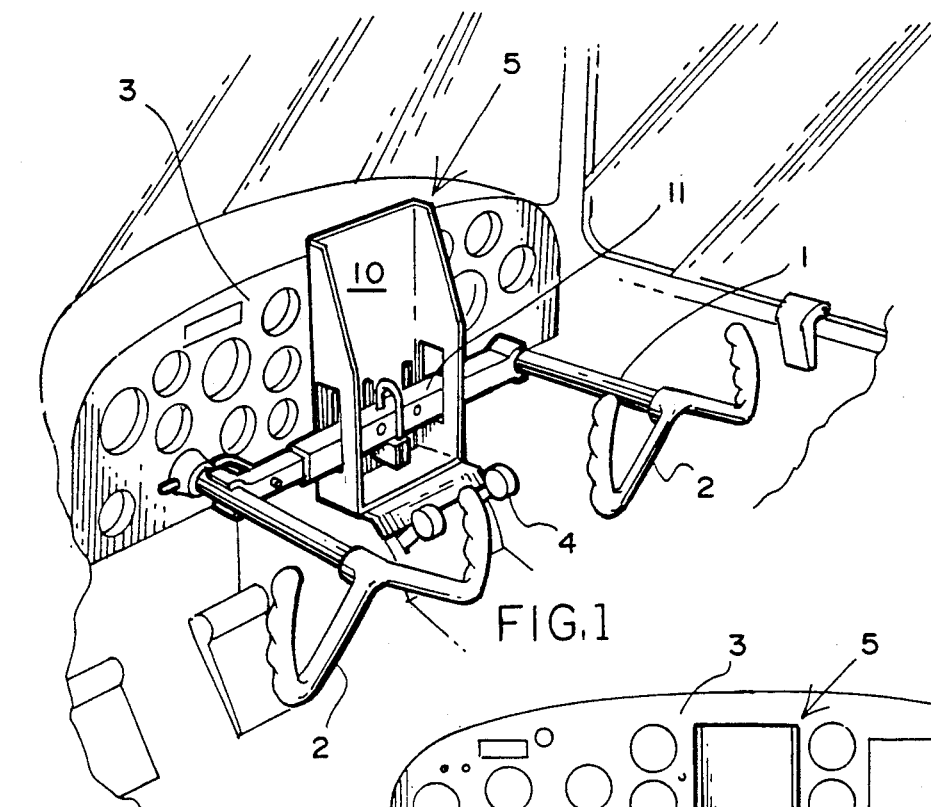
FIG. 1 is a partially broken perspective view of the interior of a single engine aircraft having dual controls including wheel and column, and showing the relationship between the combination radio, power control, and gust lock with the instrument panel and controls.
Figure 2:
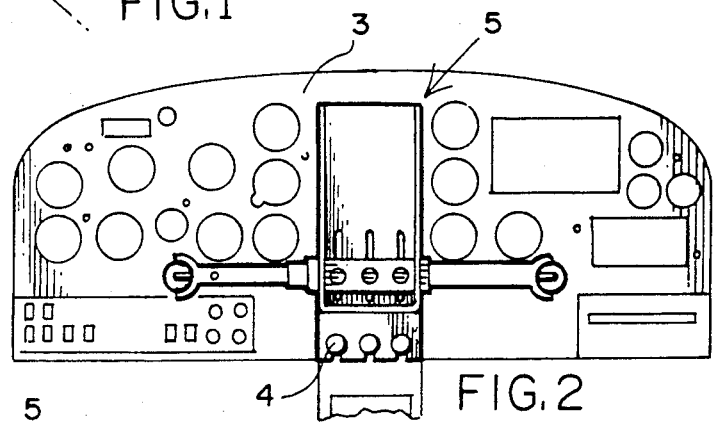
FIG. 2 is a front elevation of an instrument panel with a radio center stack.

With reference to FIG. 1 it will be seen that the typical single engine aircraft has two control columns 1, to which are secured the dual control wheels 2. The controls are actuated by turning right or left to dip the wings, and pushing in and out to control the vertical motion of the aircraft. An instrument panel 3 contains the various flight and power instruments needed to monitor the aircraft operation by the pilot. Normally there is a radio stack (shielded from view) which is in the center of the instrument panel, although the radio stack may be to the right of the power control assembly 4, or the left, or both. The subject combination lock 5 contemplates these various alternatives. For example, shown in FIGS. 1 and 2 are installations where the radio stack is in the center of the instrument panel 3. Shown in FIG. 3, however, is an option where it may be desirable to secure additional instruments whether they are in the radio stack or not. Such instruments can include a Loran, a lightning discharge monitoring array, or even a radar where multi-engine usage is involved.

Figure 3:
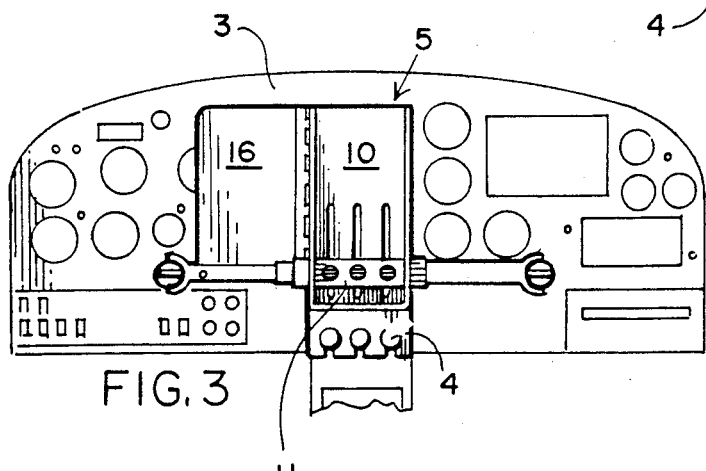
FIG. 3 is an alternative embodiment showing a dual radio stack pan.
Figure 4:
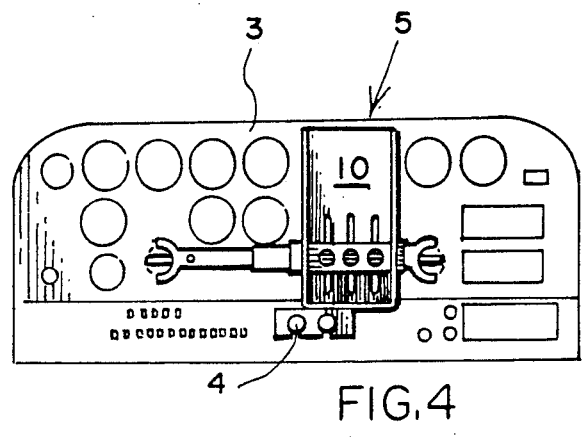
FIG. 4 is a further embodiment showing an offset radio stack as contrasted to the center radio stack of FIG. 2 disclosing its principle elements.

FIG. 4 shows the subject combination lock 5 at a position to the right of central of the instrument panel 3, and where there are only two power controls 4. As shown in FIG. 1, the power controls 4 can be of the arcuate handle type, or as shown in FIGS. 2 and 3, they can be buttons or knobs which are pushed in and out. Almost always there are at least two power controls, one being the throttle, and the other being the mixture control. Where a constant speed propeller is involved, there is an additional propeller pitch control. In almost all instances, the power controls are neutralized or off when they are in the position closest to the pilot. Alternatively, when the controls are all pushed forward, they are in position for maximum power takeoff. Thus when the power controls are to be locked, they need to be locked in the off configuration or as close to the pilot as possible.

Figure 5:
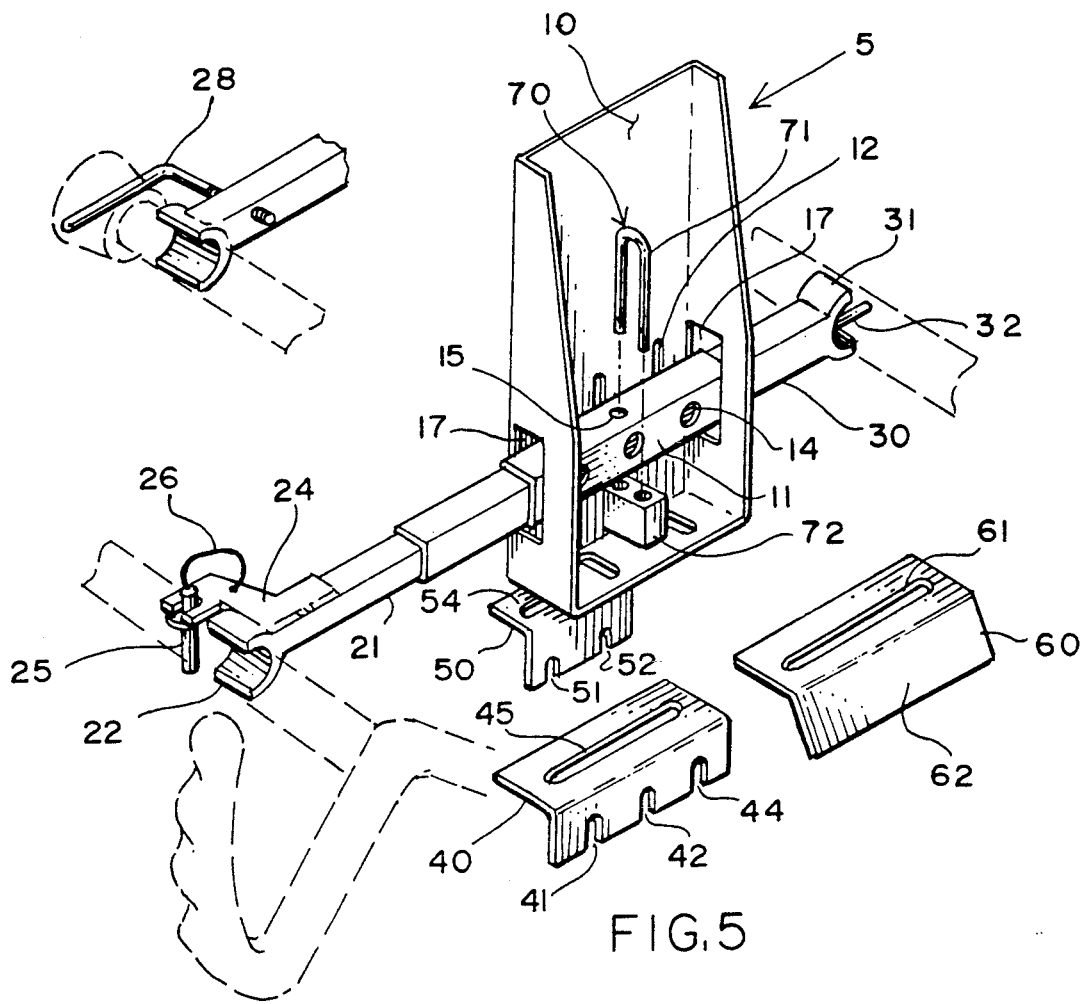
FIG. 5 is a perspective partially exploded view of the illustrative combination lock.

Turning now to FIG. 5, it will be seen that the subject combination lock 5 has as a central and key member a center lock bar 11. The center lock bar 11 is mounted adjacent the radio lock pan 10, which pan includes the center lock bar vertical adjustment slots 12. The center lock bar vertical adjustment slots 12 are accessed by means of center lock bar pan attaching screw accessory holes 14 as shown in FIG. 5. Coaxial locking hole 15 is provided in the center lock bar 11 so that the key lock assembly 70 can be passed therethrough by means of inserting the shank 71 and thereafter securing the lock block 72 to the shanks 71.

Figure 6:
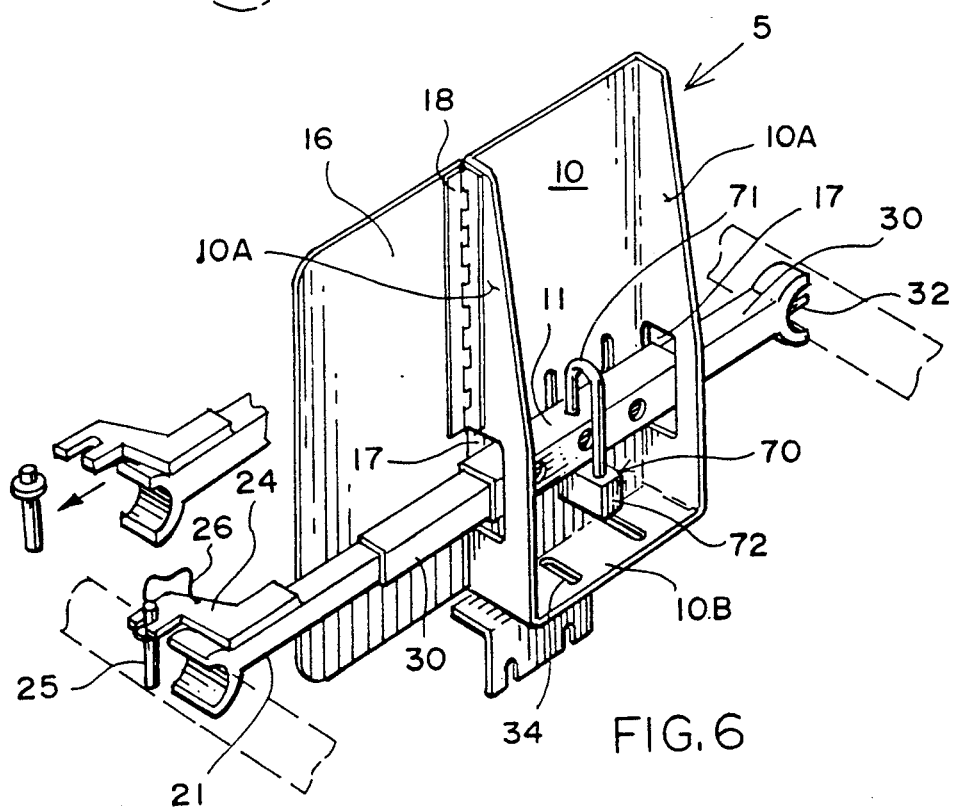
FIG. 6 is a view comparable to that of FIG. 5, but showing the radio lock pan with an optional double radio stack lock plate.
Figure 9:
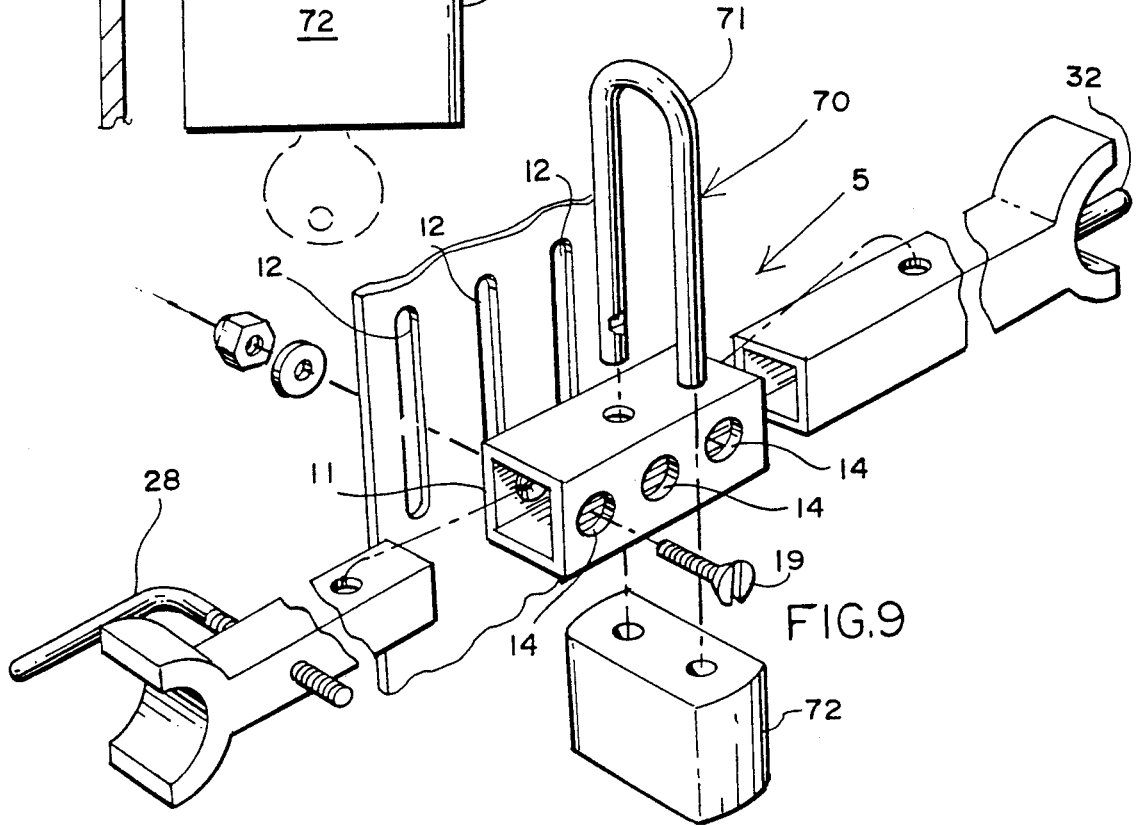
FIG. 9 is an exploded perspective partially broken view of the subject combination lock showing the adjustable relationship between the center lock bar and radio pan.

A lock bar port 17 is provided in the opposed parallel sidewalls 10a and permits the entire locking assembly surrounded by the center lock bar 11 to pass through the radio lock pan assembly 10. The bottom 10b of the radio lock pan 10 includes means for securing the power control locking plate assembly 40 in position. In the embodiment shown in FIG. 6, an option is provided with a double radio stack lock plate 16 secured by means of hinge 18 to the radio lock pan assembly 10. Center lock bar pan attachment screws 19 (as shown in FIG. 9) pass through the center lock bar pan attachment screw access holes 14 and penetrate the center lock bar vertical adjustment slots 12 to permit positioning the lock bar 11 at various heights interiorly of the radio lock pan assembly 10 as defined by the lock bar ports 17.

Figure 8:
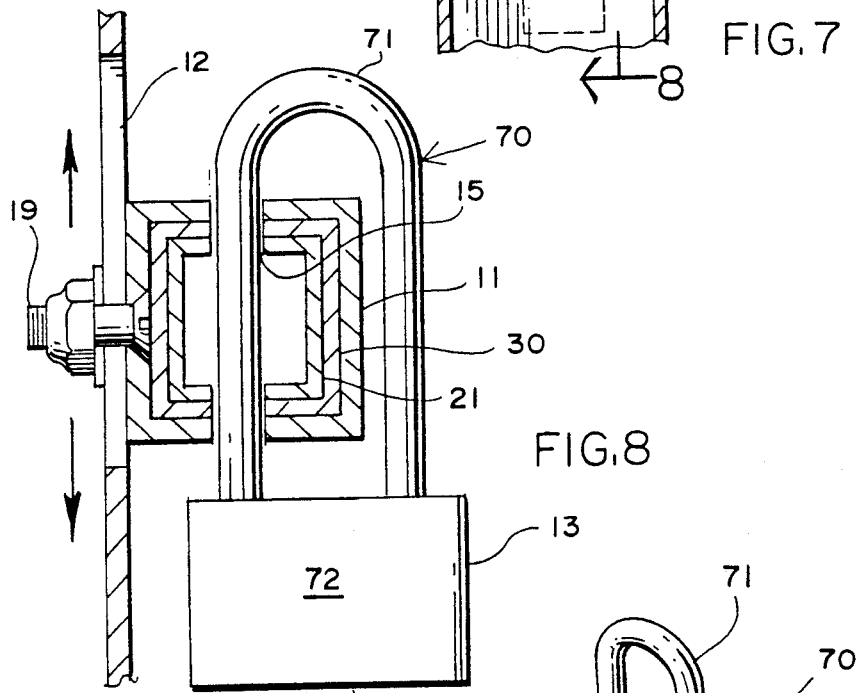
FIG. 8 is a transverse sectional view of the termination lock of FIG. 7 taken along section line 8—8 of FIG. 7 and in enlarged scale.

Two telescoping arms, telescoping arm assembly outer arm 30, and telescoping inner arm assembly 21 telescope within each other, and the two together telescope within the center lock bar 11. This telescoping arrangement in sequence is best illustrated in FIG. 8.

The two telescoping arms have at opposed ends respectively an inner arm control column grip 22, and an outer arm control column grip 31. Optionally a gust lock plate 24 is secured to one end of a telescoping arm and has an offset yoke to receive a gust lock pin 25 which is held in place by means of a lanyard 26 all as shown in FIG. 5. On the opposite end of the combination lock 5 provision is made for an outer arm control column pin 32 which engages a transverse hole in the control column 1.

Alternatively, as shown in the upper portion of FIG. 5, a gust lock pin 28 can be threadedly engaged to the telescoping arm assembly inner arm 21 and positioned to pass into a hole in the left control column similarly as to the outer arm control shaft pin 32 at the opposite end of the control lock 5.

One form of power control locking plate assembly 40 is shown in exploded relationship to the radio lock pan assembly 10 in FIG. 5. It will be seen that the power control locking plate assembly for constant speed type 40 has a vernier throttle lock slot 41, a propeller pitch control lock slot 42, and a mixture control lock slot 44. The entire power control locking plate assembly for constant speed-type controls 40 is secured by means of the lateral adjustment slot 45 to the bottom 10b of the radio lock pan assembly by suitable bolts which fit into the slots 34 in the bottom 10b of the radio lock pan assembly 10. Also as shown in FIG. 5 is but another power control locking plate assembly for a non-constant speed power set-up 50 in which there is a throttle lock slot 51 and a mixture lock slot 52, the same all being adjustably mounted to the bottom 10b of the radio lock pan 10 by means of the lateral adjustment slot 54.

Finally, yet another power control locking plate assembly 60 is shown for use with the pedestal-type power controls such as illustrated in FIG. 1. All that is required is the lateral adjustment slot 61 and a deflecting pan 62, the remote edge of which engages the pedestal mounted controls.

When all of the parts are assembled, a key lock 70 which has opposed parallel shanks 71 and a lock block 72 is positioned to penetrate the coaxial locking hole 15 in the lock bar 11, and secure all the elements together in locked relationship.

Figure 7:
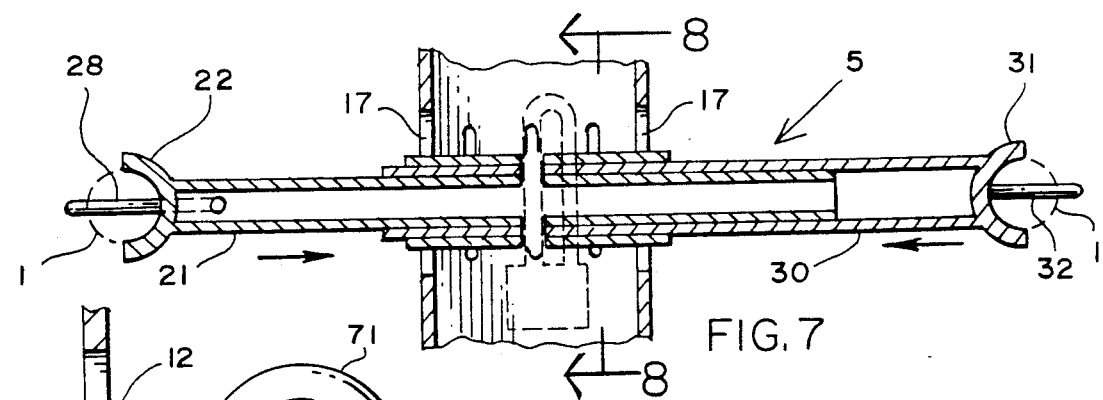
FIG. 7 is a longitudinal sectional view of the illustrative combination lock.

By reference to FIG. 8, it will be seen that the shank 71 of the lock 70 passes firstly through the lock bar 11, the telescoping outer arm 30, and then the telescoping inner arm 21. The adjustment in the vertical slot 12 by means of the center lock bar pan attachment screws 19 is also illustrated in FIG. 8. This relationship also appears in FIG. 7 where, in addition, it is shown how the gust lock pins 28 and 32 penetrate the control columns 1. FIG. 9 further illustrates the relationship between the telescoping arms 21, 30 and the lock bar 11 as well as showing how the center lock bar pan attachment screws 19 penetrate the center lock bar pan attachment screw access holes 14 and are ultimately secured in vertical adjustable relationship through the center lock bar vertical adjustment slots 12 in the ratio pan assembly 10.

In certain aircraft provision is not made for transverse through holes in the control column 1. In such an environment, gust lock retrofit assembly 80 as shown in FIG. 10 is provided. It includes a bracket 81 which has a bracket instrument panel leg 82 and bracket control column leg 84. Mounting hole 85 is provided in the bracket control column leg 84 and secured by means of the gust lock pin horizontal lock 28 as shown in threaded engagement with the telescoping inner arm 21 and its related inner arm control column grip 22.

FIGS. 11 and 12 illustrate further the use of fore and aft adjustment slots 13 for the power plate assembly 40 and how the power control locking plate pan attachment bolts 46 penetrate the bottom 10b of the radio pan assembly 10.

The method of the invention is directed to securing simultaneously the radios, power controls, and flight controls of an aircraft having parallel control columns and radios mounted between them. The steps include providing an adjustably secured assembly between the two control columns which has means to removably secure the end of the parallel control columns to the control in locking engagement. Simultaneously with the step of locking the two columns, a radio pan cover is secured over a major portion of any radio stack or instrument stack to be secured and then making sure that the radio pan is secured to the telescoping control column assembly. Finally, the power control is achieved by positioning a power control element beneath the radio locking pan and furnishing it with an extension which engages various types of power controls, whether they be pedestal mounted, or mounted directly in a lower portion of the instrument panel for push/pull type control of throttle, propeller pitch, and fuel mixture control. Once all of the elements are positioned together so that each engages its respective control column, radio pan cover, and power controls, a lock is passed through the three telescoping central members which secure the two control columns and it, in turn, secures the radio pan and the power controls in their locked relationship with respect to the various elements in the cabin which they are securing. No provision is made for a rudder lock, since the best means of securing the rudder against gusts is with an external gust lock of the variety capable of sustaining hurricane-force winds. The other controls, namely the elevators and ailerons are secured by means of locking the control columns.

It will be understood that various changes in the details, materials and arrangements of parts which have been herein described and illustrated in order to explain the nature of the invention, may be made by those skilled in the art within the principle and scope of the invention as expressed in the appended claims.

What is claimed is:

1. A combination radio lock, power control lock, and gust lock for use on dual controlled aircraft having parallel control columns comprising, in combination,
   a center lock bar having an interior adaptable to receive locking arms,
   a pair of locking arms having remote ends proportioned to adjustably engage the center lock bar,
   control shaft grips for engaging the parallel control columns each mounted at the remote ends of the locking arms,
   means for securing at least one of said control shaft grips to a control shaft column by penetrating the same,
   a radio lock pan having a base plate portion and opposed sidewalls, and openings on its sidewalls for the pass-through of the center lock bar,
   power control lock means secured at the lower portion of the radio lock pan,
   and a lock for engaging the center lock bar and having means for securing the center lock bar, the radio pan, and the engine control lock plate in position and immovably mobilizing all of the elements set forth above.

2. In the combination lock of claim 1 above,
   said center lock bar being essentially tubular in cross-section,
   said center lock bar having a plurality of through-holes,
   each of said locking arms having a tubular configuration for telescopingly engaging the center lock bar,
   and at least one pair of opposed holes in the telescoping arms through which a single locking means can be passed in opposed position to the holes in the center lock bar to thereby lockingly engage the entire assembly.

3. In the combination lock of claim 1 above,
   said power control lock means having a transverse adjustable mounting slot,
   and mounting slots in the radio lock pan bottom proportioned to have an axis essentially perpendicular to the transverse axis of the slot in the power control lock means,
   and means for securing the two slots permitting adjustment along two axes of the power control lock means.

4. In the combination lock of claim 2 above,
   said power control lock means having a transverse adjustable mounting slot,
   and mounting slots in the radio lock pan bottom proportioned to have an axis essentially perpendicular to the transverse axis of the slot in the power control lock means,
   and means for securing the two slots permitting adjustment along two axes of the power control lock means.

5. In the combination lock of claim 1 above,
   at least one slot in the plate of the radio lock pan which is vertical,
   and at least one coaxial through hole perpendicular to the radio pan slots in the assembly of the lock bar, and adjustable arms,
   and means for passing through said coaxial holes into a radio pan vertical slot to thereby permit adjustment vertically of the assembly of the lock bar and adjustable arms.

6. In the combination lock of claim 1 above,
   a gust lock retrofit assembly comprising a pair of opposed brackets, L-shaped in section, with means for securing the same to the instrument panel,
   a transverse hole in the control column leg of the brackets,
   and a transverse locking hole through the control column for receiving a gust lock horizontal pin secured to one of the adjustable arms at its remote end adjacent the control column grip.

7. A method of securing radios, engine controls, flight controls, and power controls in an aircraft having two parallel control columns and a radio stack mounted therebetween, comprising the steps of,
   providing an adjustably secured assembly comprised of telescoping arms between the two control columns which removably secures and locks the two parallel control columns,
   mounting a radio locking pan to a central lock bar mechanism,
   positioning a power control lock assembly beneath the radio pan,
   and thereafter passing a lock bar through the combination of the center lock bar, telescoping arms, to secure said combination in engagement while the radio lock pan overlays the radio stack and the two telescoping arms engage the parallel control columns and the power lock plate engages the power controls to immobilize the combination.

* * * * *